United States Patent
Koenigsfeld et al.

(10) Patent No.: US 10,815,920 B2
(45) Date of Patent: Oct. 27, 2020

(54) ENGINE SYSTEM AND METHOD WITH HYDROCARBON INJECTION AND EGR

(71) Applicant: Deere & Company, Moline, IL (US)

(72) Inventors: John R. Koenigsfeld, Cedar Falls, IA (US); Matthew R. Evers, Cedar Falls, IA (US); Graham S. Anderson, Cedar Falls, IA (US); Kevin M. Ver Lee, Cedar Falls, IA (US); John C. Scheider, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 36 days.

(21) Appl. No.: 16/165,683

(22) Filed: Oct. 19, 2018

(65) Prior Publication Data

US 2020/0123993 A1  Apr. 23, 2020

(51) Int. Cl.
*F02D 41/00* (2006.01)
*F02M 26/14* (2016.01)
(Continued)

(52) U.S. Cl.
CPC ....... *F02D 41/0077* (2013.01); *F02D 41/008* (2013.01); *F02D 41/38* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 5,983,630 A | * | 11/1999 | Kibe | F01N 3/0842 123/300 |
| 6,314,935 B2 | * | 11/2001 | Tanaka | F01N 3/0842 123/298 |

(Continued)

FOREIGN PATENT DOCUMENTS

| DE | 102016006676 A1 | 1/2017 |
|---|---|---|
| EP | 1766204 A1 | 3/2007 |

(Continued)

OTHER PUBLICATIONS

European Search Report issued in counterpart European Patent Application No. 19199365.8 dated Mar. 12, 2020 (8 pages).

*Primary Examiner* — Binh Q Tran
(74) *Attorney, Agent, or Firm* — Klintworth & Rozenblat IP LLP

(57) ABSTRACT

Engine systems and methods improve emission control through the use of concurrent HCI and EGR. An engine system includes at least two cylinders. A fuel system intermittently supplies a first fuel stream to the first cylinder and a second fuel stream to the second cylinder. An intake system supplies combustion air to the cylinders. An exhaust manifold has one or more interior chambers through which the exhaust gas from the cylinders passes. An EGR circuit is connected between the exhaust manifold and the intake system and includes an EGR valve. A controller operates the fuel system to supply the first fuel stream to deliver fuel to the exhaust system while operating the fuel system to stop the second fuel stream from delivering fuel to the exhaust system, and to open, concurrently with operating the fuel system to supply the first fuel stream, the EGR valve to supply the exhaust gas to the intake system.

21 Claims, 10 Drawing Sheets

(51) Int. Cl.
*F02M 26/17* (2016.01)
*F02D 41/38* (2006.01)
*F02D 43/04* (2006.01)

(52) U.S. Cl.
CPC ............ *F02D 43/04* (2013.01); *F02M 26/14* (2016.02); *F02M 26/17* (2016.02); *F02D 2041/389* (2013.01)

(56) References Cited

U.S. PATENT DOCUMENTS

| | | | |
|---|---|---|---|
| 6,560,960 B2* | 5/2003 | Nishimura | F01N 3/0842 123/399 |
| 7,513,106 B2 | 4/2009 | Owens | |
| 8,706,385 B2* | 4/2014 | Nakayama | F02D 41/0072 123/568.11 |
| 10,174,695 B2* | 1/2019 | Hotta | F02D 41/0055 |
| 10,316,771 B2* | 6/2019 | Ulrey | F01N 13/107 |
| 2011/0289904 A1* | 12/2011 | Miyashita | F02D 41/0082 60/278 |
| 2016/0131056 A1 | 5/2016 | Henry et al. | |

FOREIGN PATENT DOCUMENTS

| | | |
|---|---|---|
| WO | 2006004469 A1 | 1/2006 |
| WO | 2013135250 A1 | 9/2013 |

* cited by examiner

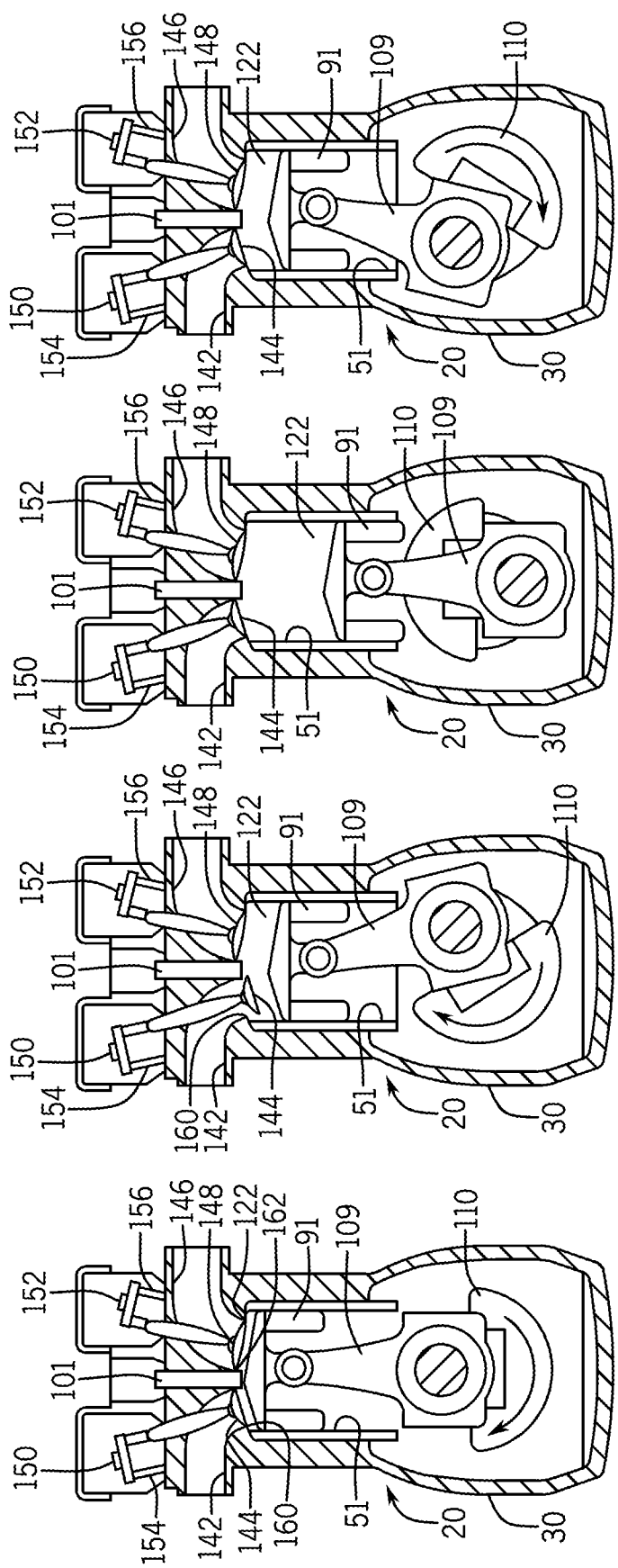

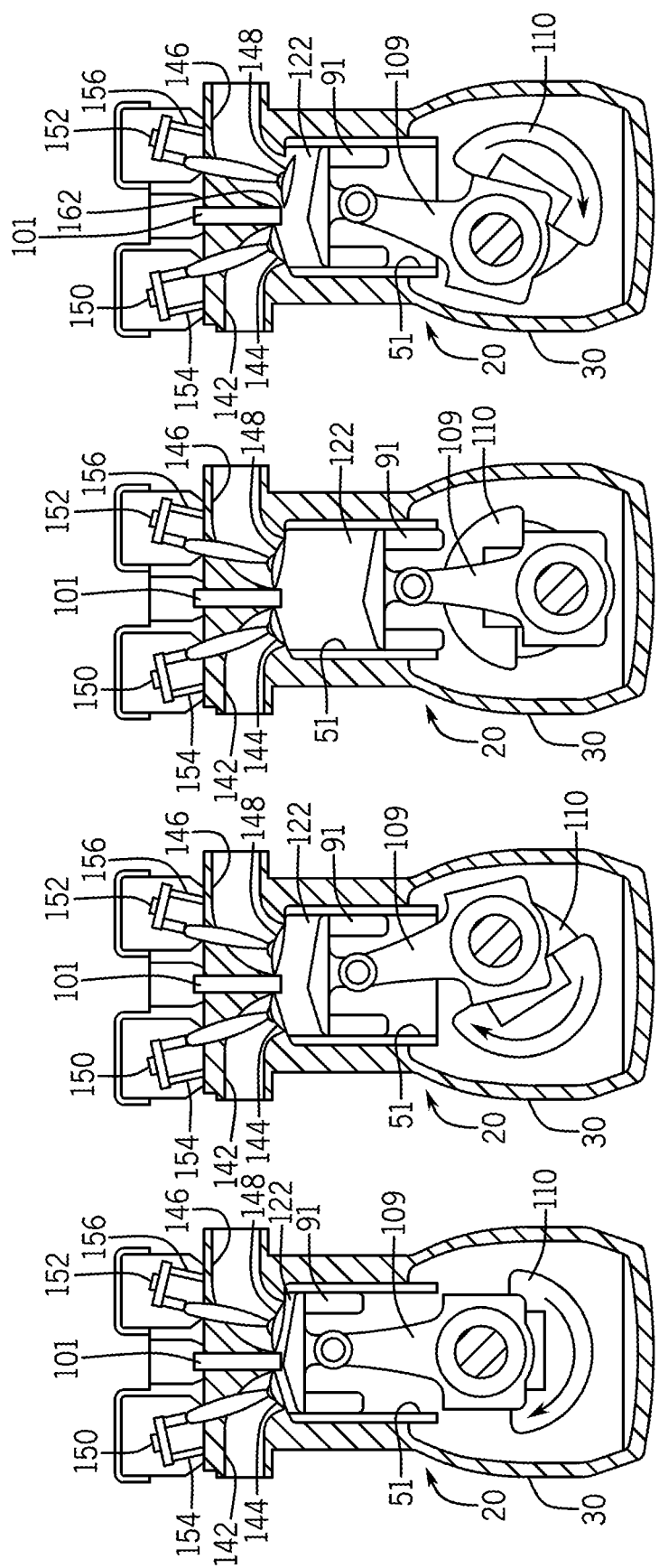

ENGINE SYSTEM AND METHOD WITH HYDROCARBON INJECTION AND EGR

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to engine systems and methods to reduce emissions, and to systems and methods that employ engine hydrocarbon injection (HCI) with concurrent exhaust gas recirculation (EGR).

BACKGROUND OF THE DISCLOSURE

Aftertreatment systems associated with some engine applications work most effectively when unburned hydrocarbons are present in the exhaust stream to react in the aftertreatment device. One way to introduce hydrocarbons is to inject fuel so that it is present in the exhaust stream entering the aftertreatment device. At the same time, many engines use EGR which recirculates some exhaust gas back to the engine intake system for delivery to the cylinders as part of the combustion air. The added exhaust gas reduces the oxygen concentration in the cylinders so that during combustion, the presence of unburnable exhaust gas reduces combustion temperatures resulting in more desirable combustion byproducts. It would be beneficial to use EGR and HCI together in certain engine operating conditions however, the introduction of unburned fuel into the EGR system is undesirable.

SUMMARY OF THE DISCLOSURE

The disclosure provides engine systems and methods with improved emission control through the use of concurrent HCI and EGR.

In one aspect, an engine system includes a cylinder block defining at least two cylinders including a first cylinder and a second cylinder. A fuel system is configured to intermittently supply a first fuel stream to the first cylinder and to intermittently supply a second fuel stream to the second cylinder. An intake system supplies combustion air to the cylinders. An exhaust manifold is connected to the cylinder block to receive the exhaust gas from the cylinders. The exhaust manifold has one or more interior chambers through which the exhaust gas from the cylinders passes. An exhaust system is configured to receive exhaust gas from the exhaust manifold. An EGR circuit is connected between the exhaust manifold and the intake system. An EGR valve is disposed in the EGR circuit. A controller is configured to operate the fuel system to supply the first fuel stream while operating the fuel system to stop the second fuel stream, and open, concurrently with operating the fuel system to supply the first fuel stream, the EGR valve to supply a portion of the exhaust gas from the second to the intake system.

In another aspect, a method of operating an engine system includes defining, by a cylinder block, at least two cylinders including a first cylinder and a second cylinder. A first fuel stream is intermittently supplied to the first cylinder by a fuel system. A second fuel stream is intermittently supplied to the second cylinder by the fuel system. An intake system supplies combustion air to the cylinders. An exhaust manifold is connected to the cylinder block and receives the exhaust gas from the cylinders. The exhaust manifold has one or more interior chambers through which the exhaust gas from the cylinders passes. An exhaust system receives exhaust gas from the exhaust manifold. An EGR circuit is connected between the exhaust manifold and the intake system and includes an EGR valve in the EGR circuit. A controller operates the fuel system to supply the first fuel stream and to stop the second fuel stream. The controller concurrently operates the fuel system to supply the first fuel stream and the EGR valve to supply the exhaust gas to the intake system.

In an additional aspect, an engine system includes a cylinder block defining at least two cylinders with a piston in each cylinder. Each of the pistons is configured to operate in an exhaust stroke to move exhaust gas out of its respective cylinder. A fuel system is configured to intermittently supply a first fuel stream to the first cylinder and to intermittently supply a second fuel stream to the second cylinder. A fuel injector system includes a first fuel injector configured to inject the first fuel stream into the first cylinder and a second fuel injector configured to inject the second fuel stream into the second cylinder. An intake system supplies combustion air to the cylinders. An exhaust manifold is connected to the cylinder block to receive the exhaust gas from the cylinders and has one or more interior chambers through which the exhaust gas from the cylinders passes. An exhaust system is configured to receive exhaust gas from the exhaust manifold. An EGR circuit is connected between the exhaust manifold and the intake system. An EGR valve is disposed in the EGR circuit. A controller is configured to operate the fuel system to supply the first fuel stream while operating the fuel system to stop the second fuel stream when the second piston is in its respective exhaust stroke, and to open, concurrently with operating the fuel system to supply the first fuel stream, the EGR valve to supply the exhaust gas to the intake system. The controller also operates the fuel system to supply the second fuel stream when the EGR valve is closed and the second piston is in its respective exhaust stroke.

The details of one or more embodiments are set forth in the accompanying drawings and the description below. Other features and advantages will become apparent from the description, the drawings, and the claims.

BRIEF DESCRIPTION OF THE DRAWINGS

FIGS. 7A-7H are schematic cross-sectional illustrations of an engine demonstrating the disclosed engine system and method in various operative states of a combustion cycle;

Like reference symbols in the various drawings indicate like elements.

DETAILED DESCRIPTION

Figure 1:
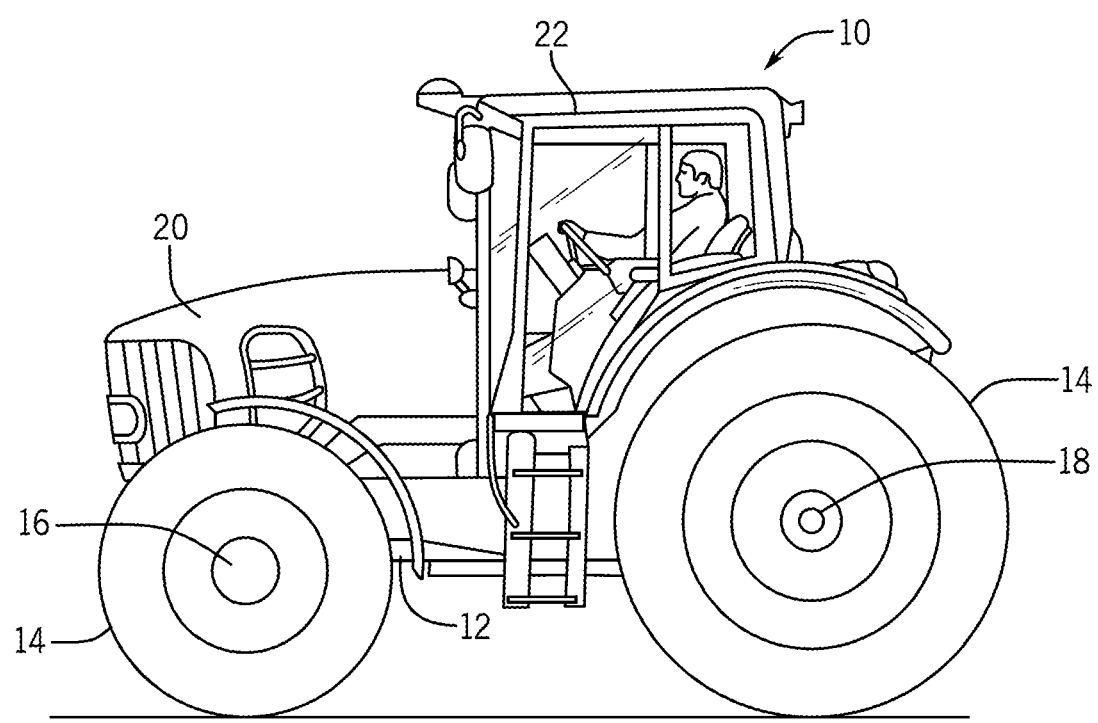
FIG. 1 is a side view of an example work vehicle in the form of an agricultural tractor in which the disclosed engine system and method may be used.

The following describes one or more example embodiments of a disclosed engine system and method with hydrocarbon injection and EGR, as shown in the accompanying figures of the drawings described briefly above. Various modifications to the example embodiments may be contemplated by one of skill in the art.

The following description relates to an engine system and method in the context of a six-cylinder internal combustion engine system application, for purposes of demonstrating an example. Internal combustion engines come in a number of different configurations (straight, V, opposed, etc.), each of which may have variations with different numbers of individual cylinders. The present disclosure is not limited to any particular engine configuration, but encompasses any application where at least two cylinders are included and both HCI and EGR are employed. In internal combustion engines, EGR is used for the purpose of recirculating a portion of the exhaust gas back into the internal combustion engine's cylinders mixed within the combustion air, thereby providing desirable combustion characteristics. For example, the addition of EGR results in a lower oxygen concentration of the combustion air in the combustion chamber and a lower combustion temperature.

Engines employing the disclosed engine system and method may be used in a wide variety of applications. One example application involves a work vehicle such as an agricultural tractor. It will be understood, however, that other applications are contemplated, including configurations for a work vehicle used for other aspects of the agriculture industry, or for the construction or forestry industries (e.g., a combine, harvester, log skidder, truck, and so on). It will further be understood that the disclosed engine system and method may also be used in non-work vehicles (e.g. passenger vehicles), non-vehicle applications (e.g. stationary power units), and with other types of equipment and machines where use of both HCI and EGR is useful.

In one or more example implementations of a disclosed engine system, the engine includes at least two cylinders. A fuel system intermittently supplies fuel to individual cylinders for purposes of combustion within the cylinder during a power stroke of the cylinder's piston and separately, for expulsion to the exhaust system during an exhaust stroke of the piston. An intake system supplies combustion air to the cylinders, and an exhaust manifold receives exhaust gas from the cylinders for routing through an exhaust system and selectively, through an EGR system. The exhaust manifold has one or more interior chambers through which the exhaust gas from all the cylinders passes without separation. An EGR circuit is connected between the exhaust manifold and the intake system, with EGR flow to the intake system is controlled by an EGR valve. A controller operates the fuel system to supply fuel to one or to a group of HCI cylinders through injectors shortly before or during the exhaust strokes of each cylinder's respective piston, without combusting the HCI fuel in the cylinder. Concurrently, the EGR valve is opened to supply a portion of the exhaust gas to the intake system, while unburned fuel enters the exhaust manifold from the HCl cylinders. With in-cylinder HCl, as the engine cycles through its cylinder firing order a relatively steady flow of unburned hydrocarbons is supplied through the exhaust manifold to an aftertreatment device. The exhaust manifold is configured so that EGR flow predominately originates from one or more cylinders in which HCl is not employed when the EGR valve is open. It has been discovered that the manifold configuration disclosed herein results in acceptably low levels of unburned hydrocarbons in the EGR circuit. The result is that both HCl and EGR are employed simultaneously to provide preferred combustion byproduct characteristics and optimum aftertreatment system performance.

In various implementations all or only some of the cylinders may be selectively in communication with, and thereby present exhaust to, the EGR circuit. For example, the entire cylinder bank may be coupled to an exhaust manifold with a unitary interior chamber common to all of the cylinders and from which the exhaust is passed to the EGR circuit. In other examples, however, the exhaust manifold may be divided such that only one or a subset of cylinders flow exhaust to the EGR circuit while the remaining cylinder or cylinders pass exhaust directly to the exhaust system after being diverted from the EGR circuit. Such divided exhaust systems may be either "fully divided" or "partially divided." The former segregates the exhaust from the cylinders flowing to the EGR circuit from the exhaust that bypasses the EGR circuit for most or all of the flow downstream from the cylinders, and in any event, the exhaust from the cylinders bypassing the EGR circuit is effectively cut off from the EGR circuit. For example, this can be achieved by using a split volute turbine in which the two exhaust streams are segregated by a septum until reaching the turbine wheel. This may have the effect of delivering independent pulse energies to the turbine wheel, one set of pulses for each stream. In a partially divided system, there may be an opportunity for the two exhaust streams to combine earlier, and thereby be mostly, but not entirely, cut off from the EGR circuit. This may happen, for example, using an open volute turbine, which allows the two exhaust streams to combine at the entry to the turbine, upstream from the turbine wheel. Whether bypassed exhaust enters the EGR circuit may be dependent on various configurational factors (e.g., the location of the EGR take-off, the cylinder count, etc.) and operational conditions (e.g., flow dynamics and so on). Pulse energy to the turbine wheel in partially divided systems may resemble that of single exhaust streams due to the earlier combining of the two exhaust streams.

Referring to FIG. 1, one example application involves an engine system that may be included in a work vehicle 10, which in this example is depicted as an agricultural tractor. The work vehicle 10 has a main frame or chassis 12 supported by wheels 14 that engage the ground. The wheels 14 support the chassis 12 through axle assemblies 16, 18. Two or more of the wheels 14 may be powered for propelling the work vehicle 10, and in this example at least the front wheels 14 are steerable to control the direction of travel. In other examples, the vehicle 10 may be articulated or otherwise configured to provide a steering function. The chassis 12 supports an engine 20 that serves as a power plant for generating power to propel the work vehicle 10 and for other uses. An operator cabin 22 is provided in which operator interface and control means (e.g., various controls wheels, levers, switches, buttons, screens, keyboards, etc.)

are stationed. The work vehicle 10 may be configured to hitch with other connected equipment in a towing arrangement, providing its propulsion power as well.

Figure 2:
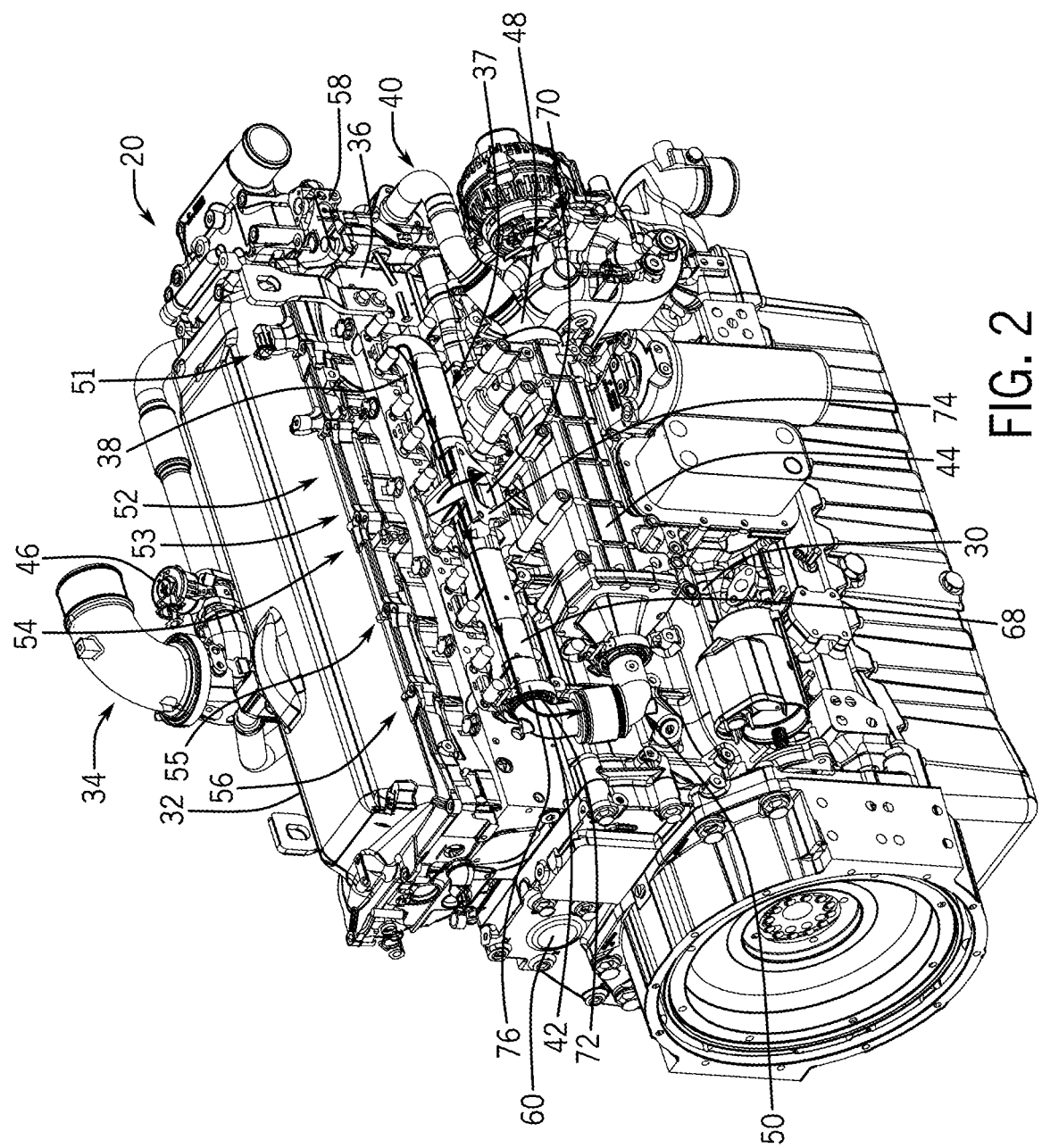
FIG. 2 is a perspective illustration the engine of the work vehicle of FIG. 1.

Referring to FIG. 2, the engine 20 is shown removed from the work vehicle 10, disconnected from its interfacing elements, and viewed in perspective, generally from its exhaust side. The engine 20 is configured as an in-line six-cylinder internal combustion engine with the cylinders defined by a cylinder block 30. The engine 20 has an intake side 32 with an intake system 34 for supplying combustion air to the cylinders and an exhaust side 36 that includes an exhaust system 37 with an exhaust manifold 38 for receiving, collecting and routing exhaust gas from all of the cylinders. An EGR system 40 is employed for selectively recirculating a portion of the engine's exhaust gas back into the cylinders through the intake system 34. In general, the EGR system 40 includes an EGR takeoff 42 at the exhaust manifold 38, an EGR cooler 44, an EGR valve 46 and various piping 48 forming an EGR circuit 50. The exhaust gas for EGR is taken from the exhaust manifold 38 upstream of any turbocharger that may be associated with the engine 20. The EGR gas is then routed through the EGR cooler 44. In this example, the EGR cooler 44 is bolted to the cylinder block 30 and engine coolant is circulated through the EGR cooler 44 to cool the EGR gas. The EGR gas is then routed in the EGR circuit 50 to the intake side 32 of the engine 20. The EGR valve 46 controls the rate of EGR gas flow into the intake system 34 and may be completely closed to suspend EGR gas flow. When the EGR valve 46 is open, the EGR gas passes into the intake system 34 at varying rates depending on the extent to which the EGR valve 46 is opened. The EGR gas is mixed with incoming ambient air received through the intake system 34 before passing into the engine 20.

Figure 3:
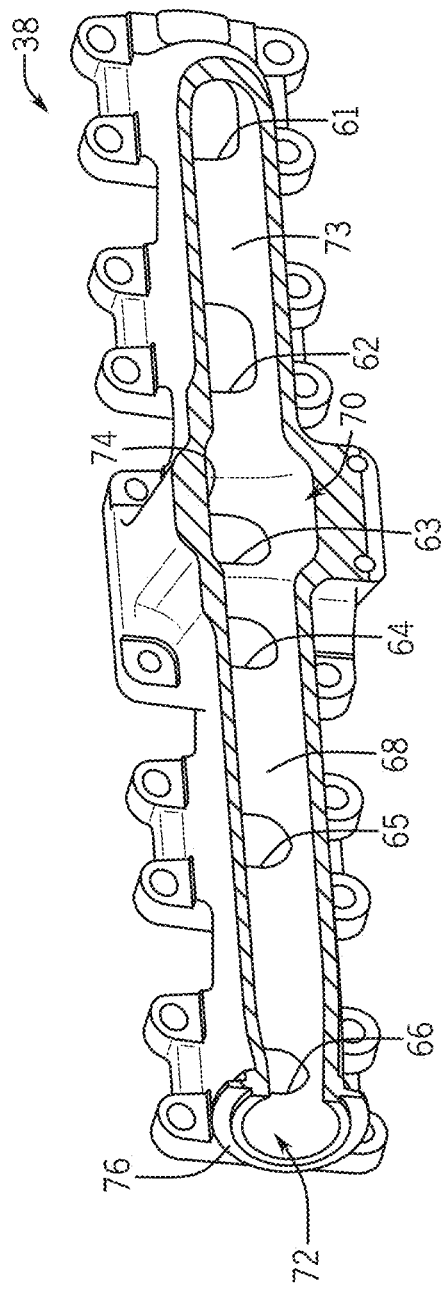
FIG. 3 is a vertical cross-sectional illustration of the exhaust manifold of the engine of FIG. 2.
Figure 4:
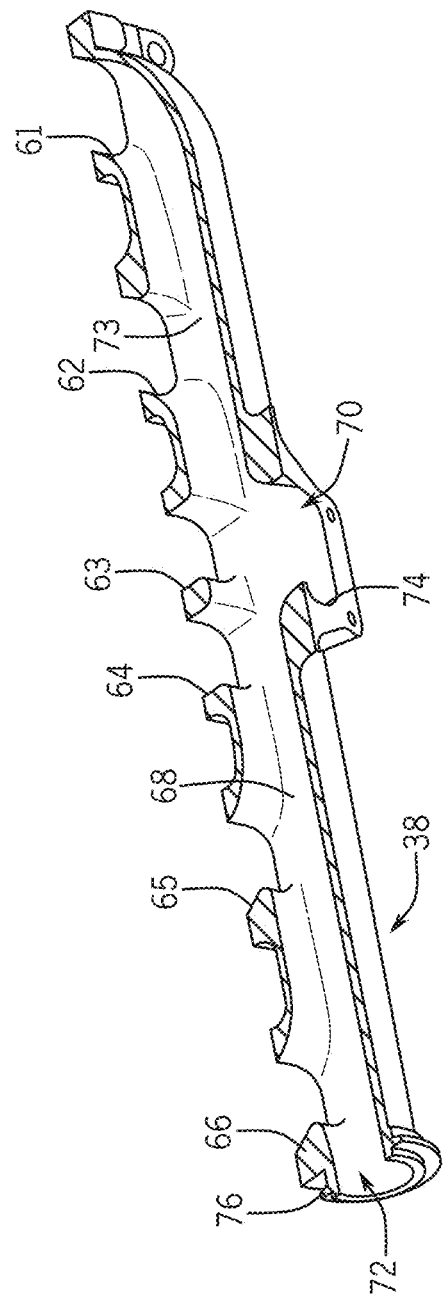
FIG. 4 is a horizontal cross-sectional illustration of the exhaust manifold of the engine of FIG. 2.

The engine includes six cylinders 51-56 arranged in-line with one another in a row and in order from the front 58 to the back 60 of the engine 20. Reference is directed additionally to FIGS. 3 and 4, where the exhaust manifold 38 is illustrated in vertical and horizontal cross-sections, respectively. The exhaust manifold 38 generally extends in a direction from the front 58 to the back 60 of the engine 20 and is bolted to the cylinder block 30 to receive all exhaust gas leaving the cylinders 51-56. The exhaust manifold 38 includes six inlet branches 61-66. The inlet branch 61 receives exhaust gas from the cylinder 51. The inlet branch 62 receives exhaust gas from the cylinder 52. The inlet branch 63 receives exhaust gas from the cylinders 53. The inlet branch 64 receives exhaust gas from the cylinder 54. The inlet branch 65 receives exhaust gas from the cylinder 55. The inlet branch 66 receives exhaust gas from the cylinder 56. The inlet branches 61-65 define internal passageways that all join together within a main trunk 68 of the exhaust manifold 38. The exhaust manifold 38 includes two outlets 70 and 72. Within the exhaust manifold 38, the inlet branches 61-65, the main trunk 68 and the area of the outlets 70, 72 combine as a unitary open interior to define a single chamber 73. With the chamber 73, all of the inlet branches 61-65 are always open to each other and to both the outlets 70, 72, without any barriers.

The outlet 70 defines a single opening 74 through which all exhaust gas permanently leaving the engine 20 must pass. In this example, the outlet 70 is aligned with the inlet branches 63, 64 in the longitudinal direction of the engine 20 so that two inlet branches 61, 62 are forward of the outlet 70 and two inlet branches 65, 66 are rearward of the outlet 70. The inlet branch 63 is partially forward of the outlet 70 and the inlet branch 64 is partially rearward of the outlet 70, and both inlet branches 63, 64 are partially aligned with the outlet 70. In other examples, the outlet 70 is further forward or further rearward in relation to the inlet branches 61-66. At least one of the inlet branches 61-66, and its respective cylinder 51-56 is on an opposite side of the outlet 70 from other of the inlet branches 61-66.

The outlet 72 includes, or is connected with the EGR takeoff 42. The outlet 72 is located at the end 76 of the exhaust manifold 38 longitudinally rearward of the inlet branch 66 so that all of the inlet branches 61-66 are on one side of the outlet 72 in the longitudinal direction of the exhaust manifold 38. With this arrangement, exhaust gas entering the main trunk 68 from the inlet branches 61-62 must travel past the outlet 70 to reach the outlet 72, if any were to do so. On the other hand, exhaust gas entering the main trunk 68 from the inlet branches 65-66 must travel in one direction to reach the outlet 70 and in the opposite direction to reach the outlet 72. Exhaust gas entering the main trunk 68 from the inlet branches 63-64 is deposited adjacent and near the outlet 70, so that at least a part of the exhaust gas entering the main trunk 68 from the inlet branches 63-64 must travel past at least a part of the outlet 70 to reach the outlet 72, if any were to do so.

Figure 5:
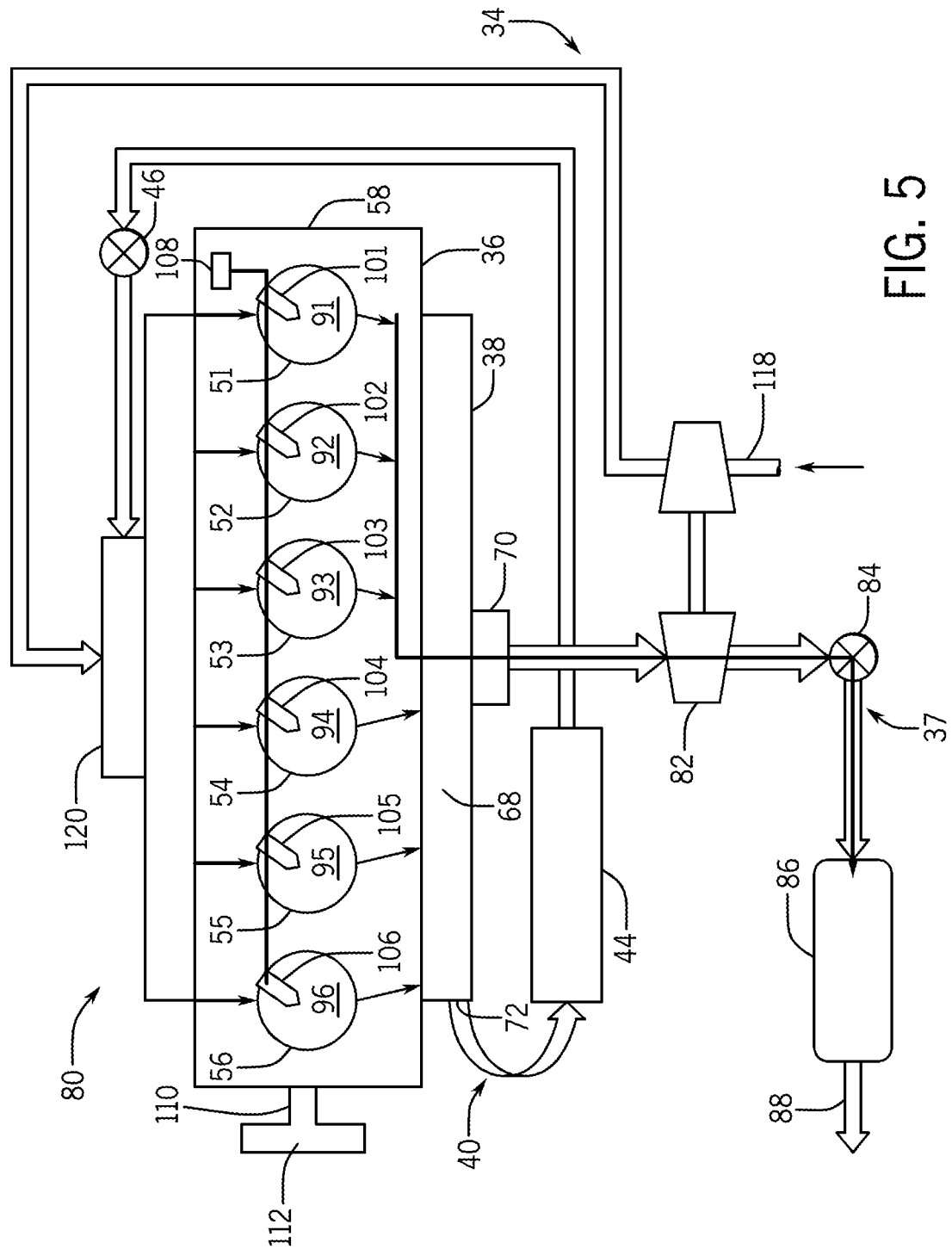
FIG. 5 is a schematic illustration of the engine system of the work vehicle of FIG. 1.

Referring to FIG. 5, the engine 20 is included in an engine system 80, which is shown schematically. In general, the engine system 80 includes the engine 20, the intake system 34, the exhaust system 37, and the EGR system 40, and may include various other known systems (not illustrated). The EGR system 40 includes the EGR takeoff 42, the EGR cooler 44, the EGR valve 46 and the piping 48 forming the EGR circuit 50. The exhaust system 37 includes the exhaust manifold 38, a turbocharger 82, an exhaust throttle valve 84, an aftertreatment device/system 86, and an exhaust pipe 88, which may include a muffler (not shown). The engine 20 includes pistons 91-96 and fuel injectors 101-106, one of each corresponding to its respective cylinder 51-56. The fuel injectors 101-106 are each connected with the fuel system 108. The engine 20 also includes a crank 110, connected with the pistons 91-96 and a flywheel 112. The aftertreatment device/system 86 may include one or more exhaust aftertreatment devices configured to change the composition of the exhaust gas. Some examples of aftertreatment devices of the aftertreatment device/system 86 include, but are not limited to, oxidation catalysts, particulate filters, NOx traps, hydrocarbon adsorbers, selective catalytic reduction systems, and/or catalytic converters. Combustion air supplied to the engine 20 is distributed to multiple air intake ports supplying all the cylinders 51-56, through an intake manifold 116. An air intake duct 118 provides a route for the supply of air from the external environment that is delivered to the intake manifold 116 through a mixer 120. The air intake duct 118 may include a filter (not shown) and in this example, supplies air through the turbocharger 82, which is controlled to provide selective boost pressure.

Figure 6:
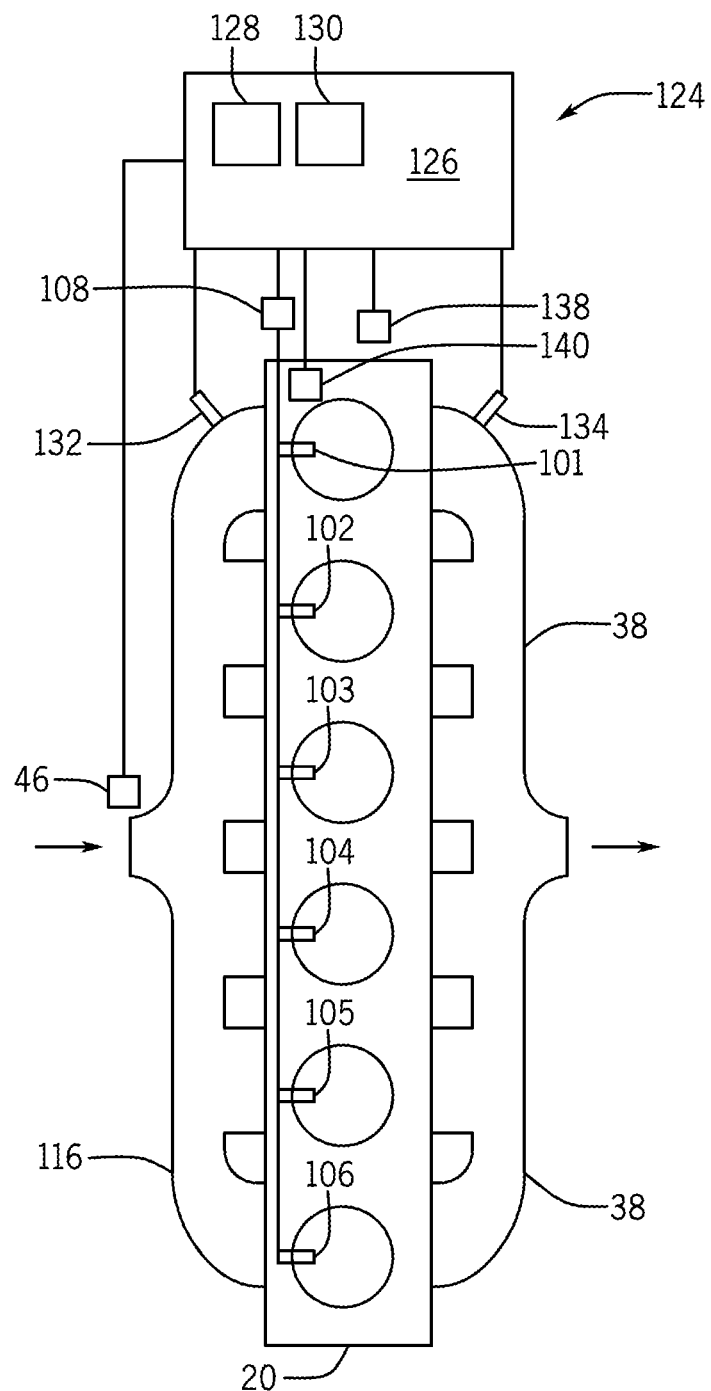
FIG. 6 is a block diagram of a control system of the engine system of FIG. 5.

As illustrated in FIG. 6, the engine 20 and the engine system 80 are associated with a control system 124, which includes a controller 126. The controller 126 includes a processor 128 and memory 130. The processor 128 performs the computation and control functions of the controller 126, and may comprise any type of processor or multiple processors, single integrated circuits such as a microprocessor, or any suitable number of integrated circuit devices and/or circuit boards working in cooperation to accomplish the functions of a processing unit. During operation, the processor 128 executes one or more programs which may be contained within the memory 130 and, as such, controls the general operation of the controller 126 and the computer system of the controller 126 in executing the processes and methods described herein. In the depicted embodiment, the memory 130 stores the above-referenced program(s). The computer system of the controller 126 may also otherwise differ from the embodiment depicted in FIG. 6, for example the computer system of the controller 126 may be coupled to or may otherwise utilize one or more remote computer systems and/or other control systems.

Generally, the controller 126, is used to provide at least some of the system operations and functions described herein. In general, the controller 126 is electrically coupled with: the fuel system 108 for control of the fuel injectors 101-106; sensor(s) 132 that may include any or all of mass airflow, temperature and pressure sensors in the intake manifold 116; the EGR valve 46; sensor(s) 134 in the exhaust manifold 38 that may include any or all of oxygen, temperature and pressure sensors; an engine crank sensor 138 for sensing position of the crankshaft 110; and a cam position sensor 140 for determining valve position. The controller 126 may also be coupled with other devices necessary to provide the desired system control functions including various other actuators and sensors such as NOx sensors (not shown) in the exhaust system 37 and an intake valve actuator (not shown) in the intake system 34. The controller 126 receives inputs from the various sensors which generate signals in proportion to various physical parameters associated with the engine 20, the engine system 80 and any other sources. In some embodiments, the controller 126 may be configured to provide other functionality of the vehicle 10 in addition to the control functions disclosed herein.

In operation, the pistons 91-96 of the engine 20 operate together with the crankshaft 110 to reciprocate in the cylinders 51-56. Combustion air is delivered to the cylinders 51-56 through the intake manifold 116 and includes external air delivered through the air intake duct 118 and EGR gas from the EGR system 40, mixed in the EGR mixer 120. When the EGR valve 46 is closed, the supply of EGR gas is curtailed, although it can be expected that some minor leakage of a trace amount of EGR gas still enters the cylinders 51-56. When EGR gas addition to the cylinders is desired, the EGR valve 46 is opened in controlled incremental positions through operation of the controller 126.

As noted above, the engine system 80 described herein may be employed in a variety of engine types, and in applications other than vehicle propulsion. Referring to FIGS. 7A-7H, the example engine 20 is illustrated schematically with regard to one cylinder 51, which includes both EGR and HCI functionality. It will be appreciated that in the simplified view of FIGS. 7A-7H, elements such as valve springs, lash adjusters, support structures, and bearings are omitted for simplicity. In addition, the engine 20 may employ any number of cylinders arranged in any configuration such as in-line, opposed or V-type. In this example, the piston 91 is disposed in the cylinder 51 defining a combustion chamber 122 that varies in size as the piston 91 reciprocates during operation of the engine 20. The piston 91 is connected through a rod 109 with the crankshaft 110, which turns with movement of the piston 91. In this example, the engine 20 includes an intake port 142 configured to be in communication with the intake manifold 116 and through which air enters the combustion chamber 122 when an intake valve 144 opens. The engine 20 also includes an exhaust port 146 allowing gases out of the combustion chamber 122 when exhaust valve 148 opens, for routing to the exhaust manifold 38. The valves 144, 148 are driven by rocker arms 150, 152 respectively, which in this example are operated by push rods 154, 156, respectively. In other examples, the valves 144, 148 are operated by other mechanizations such as an overhead cam arrangement.

In FIG. 7A the piston 91 is at a position where the combustion chamber 122 is smallest (top dead center or TDC) at the end of an exhaust stroke. The intake valve 144 is closed and seated on valve seat 160, and the exhaust valve 148 is closed and seated on valve seat 162. When the piston 91 moves downward in the cylinder 51 during an intake stroke and the crankshaft 110 turns as depicted in FIG. 7B, the push rod 154 moves in coordination, and the rocker arm 150 provides a movement output that pushes the intake valve 144 off the valve seat 160, opening the intake port 142 to the combustion chamber 122. Combustion air is drawn into the combustion chamber 122 by the moving piston 91. In this example, the EGR valve 46 is opened by the controller 126 and so the combustion air includes both outside air drawn in through the intake duct 118 and recirculated exhaust gas from the EGR system 40. It will be appreciated that unburned hydrocarbons in the recirculated exhaust gas would create undesirable fuel/air ratio conditions in the combustion chamber 122, and so the presence of fuel in the EGR gas is preferably avoided. However, it has been found that trace amounts of unburned hydrocarbons are insignificant in controlling combustion within the engine 20. The fraction of EGR gas is modulated during operation of the engine 20 by the controller through controlling the open position of the EGR valve 46 in response to sensed conditions supplied by the sensor(s) 132, the sensor(s) 134 and any other monitored parameters.

Figure 8:
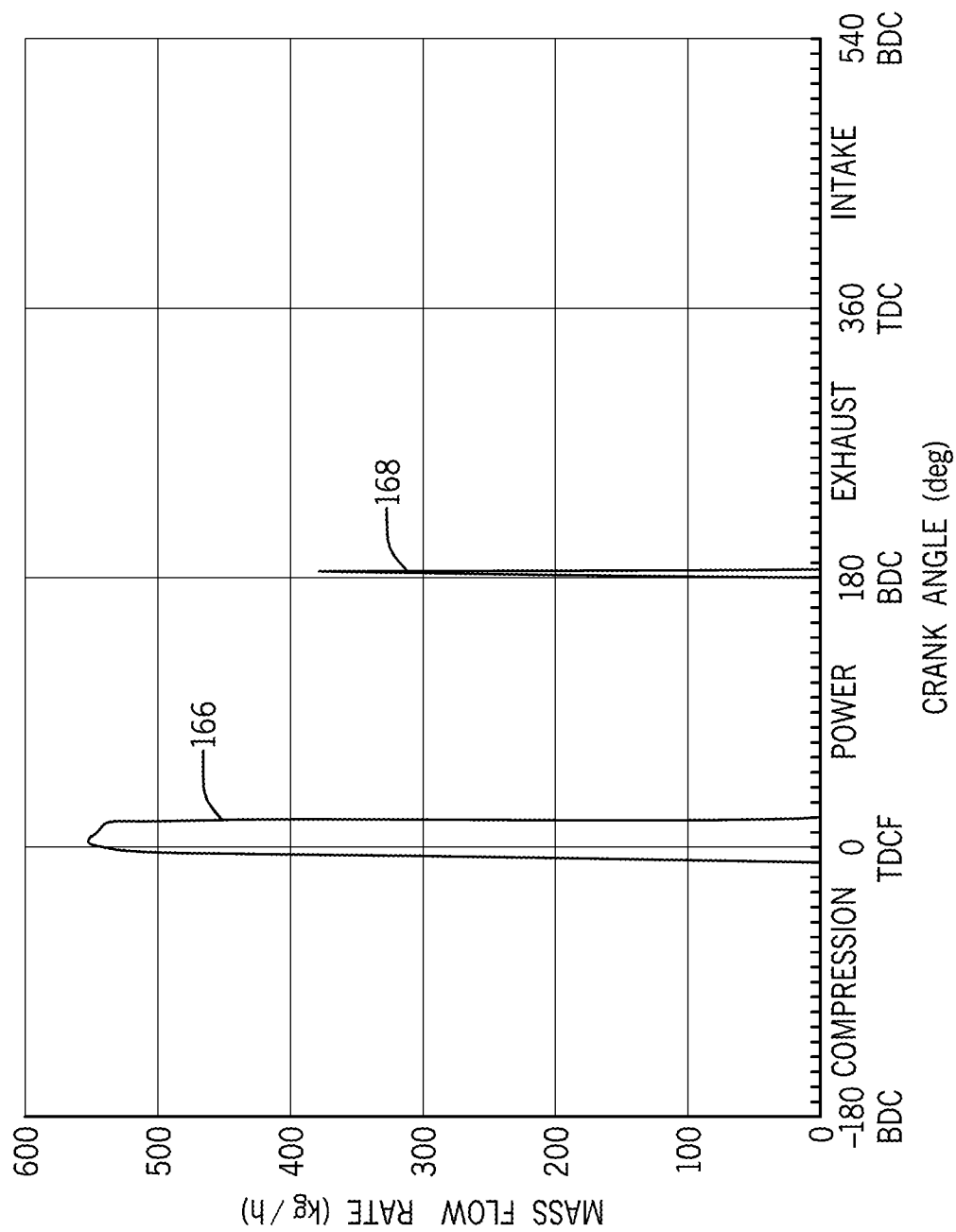
FIG. 8 is a graph of fuel mass flow rate versus crank angle for the disclosed engine system.

From the intake stroke state of FIG. 7B, the piston 91 moves to a position where the combustion chamber 122 is largest (bottom dead center or BDC), as shown in FIG. 7C. The piston 91 then begins a compression stroke, which is shown in FIG. 7D. The valves 144, 148 are closed as the air in the combustion chamber 122 is compressed. In some examples, the intake valve 144 remains open a few degrees of crankshaft rotation after BDC. During compression, fuel is introduced through the injector 101. Referring to FIG. 8, an injection 166 is timed to coincide with travel of the piston 91 around the point where the piston 91 is finally approaching, peaking and/or initially leaving the TDC position. When the piston 91 again reaches TDC at the end of the compression stroke as shown in FIG. 7E, the compressed combustion air and injected fuel is ignited, such as by compression or spark ignition, to release energy. As shown in FIG. 7F, the engine 20 next enters a power stroke as hot expanding gases force the piston 91 to expand the combustion chamber 122, rotating the crankshaft 110. During the power stroke, valves 144, 148 are closed.

At the end of the power stroke, the engine 20 returns to BDC as shown in FIG. 7G. The engine 20 next enters an exhaust stroke as shown in FIG. 7H, to clear gases from the combustion chamber 122 through the exhaust port 146. As shown in FIG. 8, around the time of the piston 91 finally approaching, bottoming, and/or initially leaving the BDC position, one or more injections 168 of fuel is added to the combustion chamber 122 by the injector 101. The exhaust valve 148 is opened and the intake valve 144 remains closed. When the piston 91 moves upward in the cylinder 51 during an exhaust stroke, the push rod 156 moves the rocker arm 152 providing a movement input thereto. The rocker arm 152 transmits the movement input providing a movement output that pushes the exhaust valve 148 off the valve seat 162 opening the exhaust port 146 to the combustion chamber 122. Movement of the piston 91 evacuates exhaust gases to the exhaust manifold 38 including the unburned fuel introduced by the injection 168. At the end of the exhaust stroke, the piston 91 returns to TDC, the exhaust valve 148 is closed, and one operating cycle of the engine 20 is complete. The exhaust gases entering the exhaust manifold 38 include unburned hydrocarbons introduced by the injection 168, which enter the main trunk 68 of the exhaust manifold 38. The main trunk 68 is open continually to both of the outlets 70, 72. Accordingly, there is no barrier between the unburned fuel in the main trunk 68 and the EGR system 40 up to the EGR valve 46.

Figure 9:
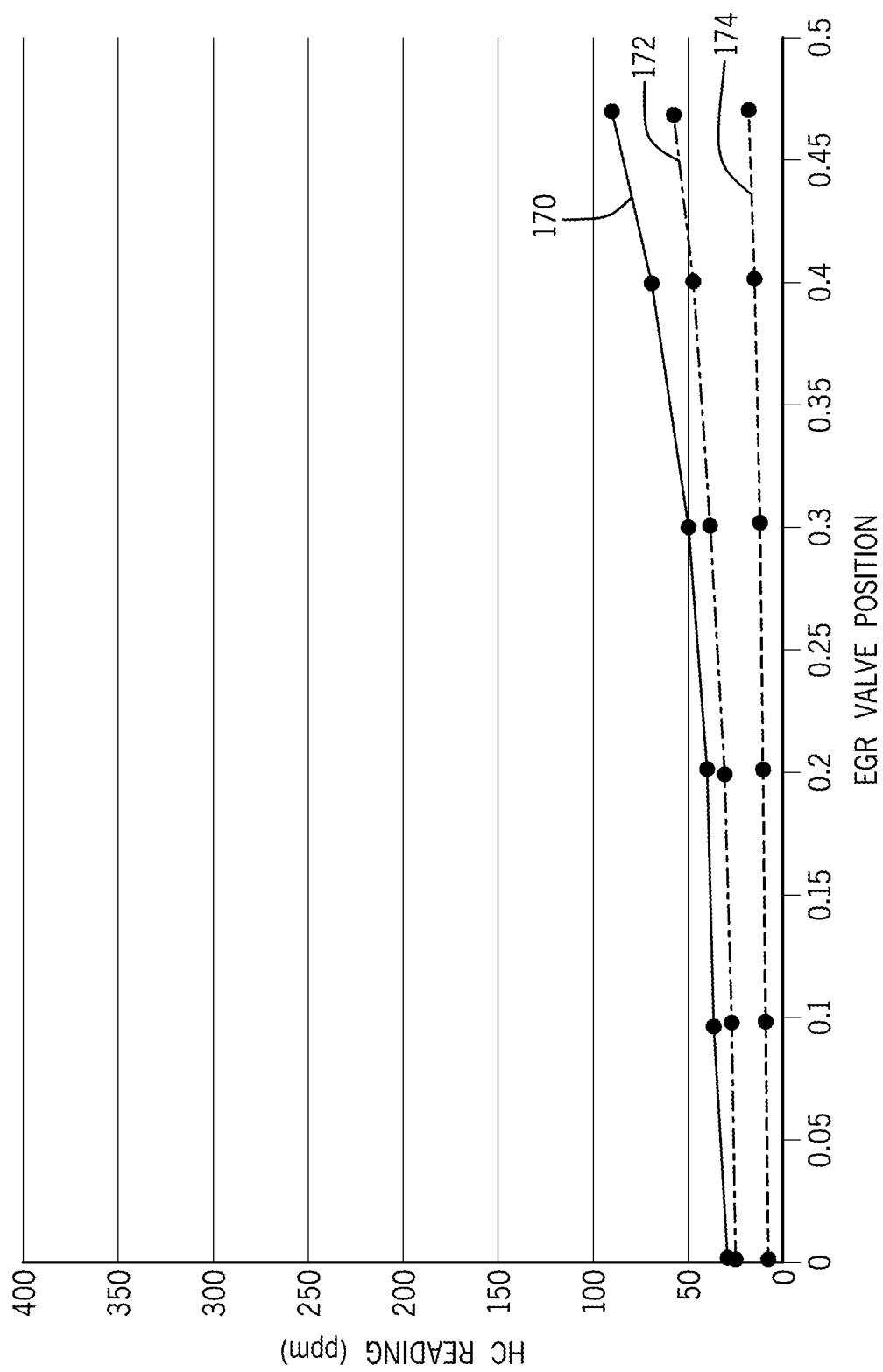
FIG. 9 is a graph of hydrocarbon concentration versus EGR valve position in the EGR gas stream for three cylinders with HCI.

The unburned fuel added by the injection 168 is intended to flow out of the exhaust manifold 38 through the outlet 70 and not through the outlet 72. In addition, the unburned fuel is intended to react in the aftertreatment device/system 86 and not in upstream parts of the exhaust system 37, such as the exhaust manifold 38. Delivering EGR gas to the HCl cylinders replaces some of the oxygen that would otherwise be present as incoming fresh air and provides gases inert to combustion that reduce in-cylinder temperatures. As a result, the temperature and pressure in the exhaust manifold 38 are lower avoiding fuel light-off in the exhaust manifold 38. The injections 168 of hydrocarbons during or just prior to the exhaust stroke is limited to less than all of the cylinders 51-56, and in the current example to three of the cylinders 51-56. Accordingly, exhaust gas from at least one of the cylinders 51-56 will not include unburned fuel when the EGR valve 46 is open enabling EGR flow. Excess unburned hydrocarbons (above a trace amount) in the cylinders 51-56 during combustion is avoided by collecting EGR gas predominately from those cylinders (54-56 in this example), without HCl injections 168. Although the hydrocarbons injections 168 flow from the cylinders 51-53 into the exhaust manifold 38 with its chamber 73 from which the EGR gas is drawn, the configuration of the outlets 70, 72 has been discovered to keep unburned hydrocarbons to a very low level. For example, when the EGR valve 46 is open, it has been found that the level of unburned hydrocarbons returning to the cylinders 51-56 through the EGR flow from the chamber 73 of the exhaust manifold 38 is less than the level of unburned hydrocarbons that typically leak through a closed EGR valve in typical HCl systems. As shown in FIG. 9, with unburned hydrocarbons indicated on the vertical axis in parts-per-million (ppm) and EGR valve position on the horizontal axis from closed at zero to half open at 0.5, the concentration of unburned hydrocarbons ranges between approximately ten and 90 ppm. Curve 170 shows unburned hydrocarbon concentration in the combustion air for an injection 168 in cylinder 51 of one gram per second results in approximately 25 ppm of unburned hydrocarbons when the EGR valve 46 is closed and approximately 90 ppm when the EGR valve 46 is half open. Curve 172 shows unburned hydrocarbon concentration for an injection 168 in cylinder 52 of one gram per second results in approximately 20 ppm of unburned hydrocarbons when the EGR valve 46 is closed and approximately 55 ppm when the EGR valve 46 is half open. Curve 174 shows unburned hydrocarbon concentration for an injection 168 in cylinder 53 of one gram per second results in approximately 10 ppm of unburned hydrocarbons when the EGR valve 46 is closed and approximately 20 ppm when the EGR valve 46 is half open. Accordingly, the maximum concentration from any of-cylinder with HCl is 90 ppm or about 0.009% concentration.

Through the examples described above, an engine system 80 and method of operating the engine system 80 includes HCl in-cylinder dosing in less than all of the engine's cylinders 51-56 while the EGR valve 46 is open. EGR gas is pulled from an exhaust manifold 38 with the chamber 73, which during HCl dosing contains unburned hydrocarbons from the HCl injections. Concurrent with HCl dosing, EGR flow is enabled without excess fuel/hydrocarbons in the EGR circuit. HCl injections 168 are curtailed in the cylinder or cylinders 54-56 nearest the EGR takeoff 42 when the EGR valve 46 is open. When the EGR valve 46 is closed, HCl injections 168 may be made in all cylinders 51-56.

The foregoing discussion details one or more implementations of the disclosed system and method in the context of a system in which each of the cylinders is selectively open to the EGR circuit through a single unitary exhaust manifold having a single open interior chamber in communication with each of the cylinders. However, as alluded to in the introduction to this discussion, less than all of the cylinders may be selectively isolated or communicated with the EGR circuit by using a divided exhaust system of various types that incorporate a divided exhaust manifold. The arrangement of components and principle of operation are generally the same as detailed above, although for clarity, example implementations of divided exhaust systems will now be described briefly with reference to the schematic representation of FIG. 10. Like reference numbers for similar components will be used albeit with a prime symbol appended thereto.

Engine system 80' includes an engine 20', an intake system 34', an exhaust system 37', and an EGR system 40'. The EGR system 40' includes an EGR takeoff 42', an EGR cooler 44', an EGR valve 46' and piping 48' forming an EGR circuit 50'. The exhaust system 37' includes a divided exhaust manifold 38A', 38B', a turbocharger 82', an exhaust throttle valve 84', an aftertreatment device/system 86', and an exhaust pipe 88', which may include a muffler (not shown). The engine 20' includes pistons 91'-96' and fuel injectors 101'-106', one of each corresponding to its respective cylinder 51'-56'. The fuel injectors 101'-106' are each connected with a fuel system 108'. The engine 20' also includes a crank 110', connected with the pistons 91'-96' and a flywheel 112'. The aftertreatment device/system 86' may include one or more exhaust aftertreatment devices configured to change the composition of the exhaust gas (e.g., oxidation catalysts, particulate filters, NOx traps, hydrocarbon adsorbers, selective catalytic reduction systems, and/or catalytic converters). Combustion air supplied to the engine 20' is distributed to multiple air intake ports supplying all the cylinders 51'-56', through an intake manifold 116'. An air intake duct 118' provides a route for the supply of air from the external environment that is delivered to the intake manifold 116' through a mixer 120'. The air intake duct 118' may include a filter (not shown) and in this example, supplies air through the turbocharger 82', which is controlled to provide selective boost pressure.

The divided exhaust manifold 38A', 38B' is bolted to the cylinder block 30'. Here, the section 38A' of the exhaust manifold receives exhaust gas leaving the cylinders 51'-53', and the section 38B' of the exhaust manifold receives exhaust gas leaving the cylinders 54'-56', each passing through one of two sets of three (six total) inlet branches (not shown, but similar to branches 61-66 described above) defining internal passageways. The three inlet branches leading from the cylinders 51'-53' join together within a main trunk of the exhaust manifold section 38A', and the three inlet branches leading from the cylinders 54'-56' join together within a main trunk of the exhaust manifold section 38B'. The exhaust manifold section 38A' includes a single outlet 70A', and the exhaust manifold section 38B' includes two outlets 70B' and 72'. Within each exhaust manifold section 38A', 38B', the associated inlet branches, the main trunk and the area of the outlets define interior chambers 73A', 73B', respectively, which are always open to each other without any barriers. The interior chambers 73A', 73B', however, are isolated from each other to segregate the exhaust streams coming from the associated banks of cylinders.

The outlet 70A' of the exhaust manifold section 38A' defines a single opening through which all exhaust coming from the cylinders 51'-53' must pass. The precise location of the outlet 70A' may vary in position with respect to the associated inlet branches so that one or more of the inlet branches are aligned with, or forward or rearward of the outlet 70A'. In the example illustrated in FIG. 10, the outlet 70A' leads exhaust gas from the cylinders 51'-53' directly to the turbocharger 82'. The outlet 70B' of the exhaust manifold section 38B' defines a single opening through which a portion of the exhaust coming from the cylinders 54'-56' passes. The precise location of the outlet 70B' may vary in position with respect to the associated inlet branches so that one or more of the inlet branches are aligned with, or forward or rearward of the outlet 70B'. The outlet 72' may be located at the end of the exhaust manifold section 38B' longitudinally rearward of the inlet branch associated with cylinder 56' so that all of the inlet branches are on one side of the outlet 72' in the longitudinal direction of the exhaust manifold section 38B'. However, the precise location of the outlet 72' may vary in position with respect to the associated inlet branches so that one or more of the inlet branches are aligned with, or forward or rearward of the outlet 72'.

The outlets 70A' and 70B' are plumbed directly to the turbocharger 82'. In the case of the exhaust manifold section 38A', since outlet 70A' is the only outlet, all exhaust gas from cylinders 51'-53' must pass through the opening of the outlet 70A' and on to the turbocharger 82'. These cylinders 51'-53' may thus be used for HCI dosing and characterized as the HCI dosed cylinders. The exhaust gas from the cylinders 54'-56' may pass through one or both of the outlets 70B' and 72'. Since the outlet 72' includes, or is connected with the EGR takeoff 42', the exhaust manifold section 38B' puts the cylinders 54'-56' in selective communication with the EGR system 40' upstream of the turbocharger 82', while the cylinders 51'-53' are not in communication with the EGR system 40', either not at all or at least not upstream of the turbocharger 82'. The cylinders 54'-56' may thus be used to selectively feed the EGR system 40' and not HCI dosed, and thus characterized as the EGR cylinders.

Figure 10:
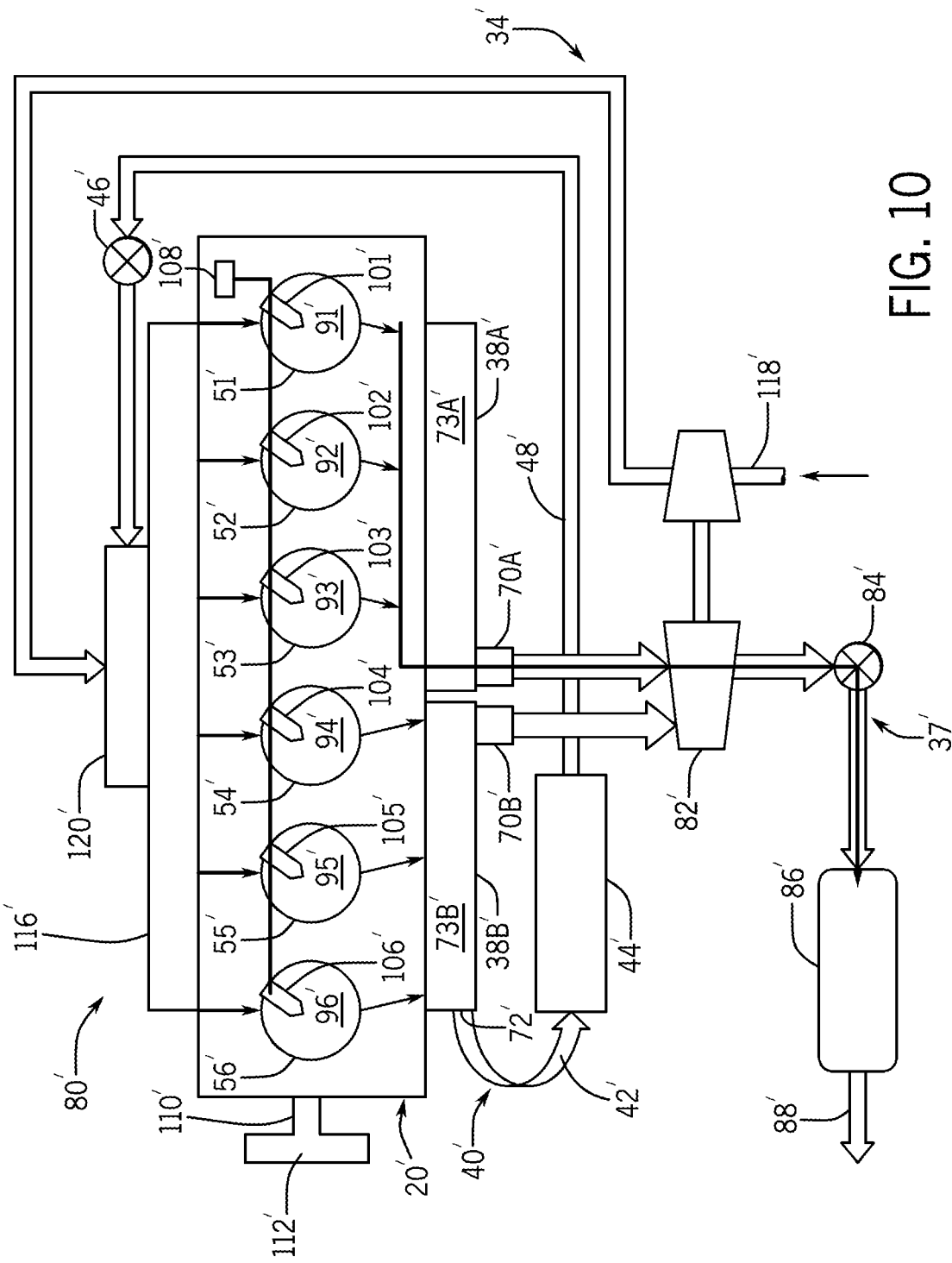
FIG. 10 is a schematic illustration of alternate engine system of the work vehicle of FIG. 1.

The amount of exhaust gas from the cylinders 54'-56' will generally depend on various operational parameters and flow dynamics, but configurational factors may also affect flow to the EGR system 40', including the relative position of the outlets 70B' and 72' as well as the location of the EGR take-off 42' relative to the inlet passages leading from the cylinders 54'-56' to the exhaust manifold section 38B'. The location of the EGR take-off 42' may also be dictated by packaging considerations. Generally, flow division similar to that described above may occur in the exhaust manifold section 38B'. Although in the case of a partially divided exhaust system, as described below, HCI bleed-over (i.e., downstream mixing of exhaust gas from the HCI dosed cylinders 51'-53' with that from the non-dosed EGR cylinders 54'-56') may be reduced or eliminated by proper placement of the EGR take-off 42'. Locating the EGR take-off 42' away from the outlet 70B', as depicted in FIG. 10, generally will cause less HCI bleed-over, while locating the EGR take-off 42' closer to the outlet 70B' (either upstream or downstream from its opening) may cause more HCI bleed-over, all things otherwise being the same.

Generally, HCI bleed-over is only present in partially-divided exhaust systems in which the exhaust gas from one bank of cylinders is not totally segregated from the exhaust gas of one or more other banks of cylinders. In the illustrated example, a fully divided exhaust system may be achieved by the turbocharger 82' having a dual or split volute in which a septum or other partition (not shown) maintains separation of the exhaust gas streams passing from the outlets 70A', 70B' of the exhaust manifold sections 38A', 38B', respectively, until reaching the turbine wheel (not shown), either just upstream, within or downstream thereof. In such split volute turbochargers, the flow area for each exhaust stream may be the same or different. In one example implementation, the turbocharger 82' may have an asymmetric split volute in which the cross-sectional area of the volute for the exhaust gas from the EGR cylinders 54'-56' is smaller than that of the volute for the HCI dosed cylinders 51'-53'. Various porting and valving may be employed to bleed flow between the volutes (e.g., from the relatively small volute to the relatively large volute).

Alternatively, a partially divided exhaust system may be effected by the turbocharger 82' having a single or open volute in which the exhaust gas streams from the outlets 70A', 70B' of the exhaust manifold sections 38A', 38B', respectively, combine upon entering the turbocharger 82', upstream of the turbine wheel. The combined flow may provide a single pulse energy stream to the turbine wheel as compared with independent pulse energies that may be applied to the turbine wheel in fully divided exhaust systems.

The foregoing provides various example implementations in which the disclosed engine system may be used. Also, the following examples are provided, which are numbered for easier reference.

1. An engine system including a cylinder block defining at least two cylinders including a first cylinder and a second cylinder; a fuel system configured to intermittently supply a first fuel stream to the first cylinder and to intermittently supply a second fuel stream to the second cylinder; an intake system supplying combustion air to the cylinders; an exhaust manifold connected to the cylinder block to receive the exhaust gas from the cylinders, the exhaust manifold having one or more interior chambers through which the exhaust gas from the cylinders passes; an exhaust system configured to receive exhaust gas from the exhaust manifold; an exhaust gas recirculation (EGR) circuit connected between the exhaust manifold and the intake system; an EGR valve disposed in the EGR circuit; and a controller configured to: operate the fuel system to supply the first fuel stream to deliver fuel to the exhaust system while operating the fuel system to stop the second fuel stream from delivering fuel to the exhaust system; and open, concurrently with operating the fuel system to supply the first fuel stream, the EGR valve to supply a portion of the exhaust gas from the second cylinder to the intake system.

2. The engine system of example 1, wherein the exhaust manifold includes one or more openings to the exhaust system, wherein the one or more openings route the exhaust gas to the exhaust system.

3. The engine system of example 1, further including a fuel injector system with a first fuel injector configured to inject the first fuel stream into the first cylinder and a second fuel injector configured to inject the second fuel stream into the second cylinder.

4. The engine system of example 1, further including: a first piston in the first cylinder and a second piston in the second cylinder, each of the pistons configured to operate in an exhaust stroke to move exhaust gas out of its respective cylinder; wherein the controller is configured to operate the fuel system to supply the first fuel stream when the first piston is in its respective exhaust stroke.

5. The engine system of example 4, wherein the controller is configured to operate the fuel system to stop the second fuel stream when the second piston is in its respective exhaust stroke.

6. The engine system of example 1, wherein the one or more chambers of the exhaust manifold are configured to: intermittently open to one or more of the cylinders; continuously open to the exhaust system; and continuously open to the EGR circuit.

7. The engine system of example 1, wherein the cylinders are arranged in a row with an end, and the exhaust manifold includes an EGR takeoff connected to the EGR circuit and disposed at the end.

8. The engine system of example 1, wherein the controller is configured to operate the fuel system to supply the second fuel stream when the EGR valve is closed.

9. The engine system of example 8, further including a piston in the second cylinder that operates in an exhaust stroke, wherein the second fuel stream is supplied when the piston is in the exhaust stroke.

10. A method of operating an engine system including: defining, by a cylinder block, at least two cylinders including a first cylinder and a second cylinder; supplying, intermittently and by a fuel system, a first fuel stream to the first cylinder; supplying, intermittently and by the fuel system, a second fuel stream to the second cylinder; supplying, by an intake system, combustion air to the cylinders; receiving, by an exhaust manifold connected to the cylinder block, the exhaust gas from the cylinders, the exhaust manifold having one or more interior chambers through which the exhaust gas from the cylinders passes; receiving, in an exhaust system, exhaust gas from the exhaust manifold; connecting an exhaust gas recirculation (EGR) circuit between the exhaust manifold and the intake system; positioning an EGR valve in the EGR circuit; operating, by a controller, the fuel system to supply the first fuel stream; operating, by the controller, the fuel system to stop the second fuel stream; and opening, by the controller and concurrently with operating the fuel system to supply the first fuel stream, the EGR valve to supply the exhaust gas to the intake system.

11. The method of example 10, further including connecting the exhaust manifold with the exhaust system through one or more openings that route the exhaust gas to the exhaust system.

12. The method of example 10, further including: injecting, by a first fuel injector, the first fuel stream into the first cylinder; and injecting, by a second fuel injector, the second fuel stream into the second cylinder.

13. The method of example 10, further including: operating, a first piston in a first exhaust stroke to move exhaust gas out of the first cylinder; operating, a second piston in a second exhaust stroke to move exhaust gas out of the second cylinder; and operating the fuel system to supply the first fuel stream when the first piston is in the first exhaust stroke.

14. The method of example 13, further including operating the second fuel injector to stop the second fuel stream when the second piston is in the second exhaust stroke.

15. The method of example 10, further including: opening, intermittently, the one or more chambers of the exhaust manifold to one or more of the cylinders; opening, continuously, the one or more chambers to the exhaust system; and opening, continuously, the one or more chambers to the EGR circuit.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An engine system comprising:
   a cylinder block defining at least two cylinders including a first cylinder and a second cylinder;
   a fuel system configured to intermittently supply a first fuel stream to the first cylinder and to intermittently supply a second fuel stream to the second cylinder;
   an intake system supplying combustion air to the cylinders;
   an exhaust manifold connected to the cylinder block to receive exhaust gas from the cylinders, the exhaust manifold having one or more interior chambers through which the exhaust gas from the cylinders passes to at least one first outlet located on the exhaust manifold at an intermediate position relative to a direction between the cylinders, the exhaust manifold having a second outlet located on the exhaust manifold closer to the second cylinder than to the first cylinder;
   an exhaust system configured to receive the exhaust gas from the exhaust manifold through the at least one first outlet; and
   an exhaust gas recirculation (EGR) circuit connected to the second outlet and extending between the exhaust manifold and the intake system;
   an EGR valve disposed in the EGR circuit; and
   a controller configured to:
     operate the fuel system to supply the first fuel stream to deliver fuel to the exhaust system while operating the fuel system to stop the second fuel stream from delivering fuel to the exhaust system; and
     open, concurrently with operating the fuel system to supply the first fuel stream, the EGR valve to supply a portion of the exhaust gas from the second cylinder to the intake system.

2. The engine system of claim 1, wherein the exhaust manifold includes one or more openings to the exhaust system, wherein the one or more openings route exhaust gas to the exhaust system.

3. The engine system of claim 1, further comprising a fuel injector system with a first fuel injector configured to inject the first fuel stream into the first cylinder and a second fuel injector configured to inject the second fuel stream into the second cylinder.

4. The engine system of claim 1, further comprising:
a first piston in the first cylinder and a second piston in the second cylinder, each of the pistons configured to operate in an exhaust stroke to move exhaust gas out of its respective cylinder;
wherein the controller is configured to operate the fuel system to supply the first fuel stream when the first piston is in its respective exhaust stroke.

5. The engine system of claim 4, wherein the controller is configured to operate the fuel system to stop the second fuel stream when the second piston is in its respective exhaust stroke.

6. The engine system of claim 1, wherein the one or more chambers of the exhaust manifold are configured to:
intermittently open to one or more of the cylinders;
continuously open to the exhaust system; and
continuously open to the EGR circuit.

7. The engine system of claim 1, wherein the cylinders are arranged in a row with an end, and the exhaust manifold includes an EGR takeoff connected to the EGR circuit and disposed at the end.

8. The engine system of claim 1, wherein the controller is configured to operate the fuel system to supply the second fuel stream when the EGR valve is closed.

9. The engine system of claim 8, further comprising a piston in the second cylinder that operates in an exhaust stroke, wherein the second fuel stream is supplied when the piston is in the exhaust stroke.

10. A method of operating an engine system comprising:
defining, by a cylinder block, at least two cylinders including a first cylinder and a second cylinder;
supplying, intermittently and by a fuel system, a first fuel stream to the first cylinder;
supplying, intermittently and by the fuel system, a second fuel stream to the second cylinder;
supplying, by an intake system, combustion air to the cylinders;
receiving, by an exhaust manifold connected to the cylinder block, exhaust gas from the cylinders, the exhaust manifold having one or more interior chambers through which the exhaust gas from the cylinders passes to at least one first outlet located on the exhaust manifold at an intermediate position relative to a direction between the cylinders, the exhaust manifold having a second outlet located on the exhaust manifold closer to the second cylinder than to the first cylinder;
receiving, in an exhaust system, the exhaust gas from the exhaust manifold;
connecting to the second outlet an exhaust gas recirculation (EGR) circuit that extends between the exhaust manifold and the intake system;
positioning an EGR valve in the EGR circuit;
operating, by a controller, the fuel system to supply the first fuel stream;
operating, by the controller, the fuel system to stop the second fuel stream; and
opening, by the controller and concurrently with operating the fuel system to supply the first fuel stream, the EGR valve to supply the exhaust gas to the intake system.

11. The method of claim 10, further comprising connecting the exhaust manifold with the exhaust system through one or more openings that route the exhaust gas to the exhaust system.

12. The method of claim 10, further comprising:
injecting, by a first fuel injector, the first fuel stream into the first cylinder; and
injecting, by a second fuel injector, the second fuel stream into the second cylinder.

13. The method of claim 10, further comprising:
operating, a first piston in a first exhaust stroke to move exhaust gas out of the first cylinder;
operating, a second piston in a second exhaust stroke to move exhaust gas out of the second cylinder; and
operating the fuel system to supply the first fuel stream when the first piston is in the first exhaust stroke.

14. The method of claim 13, further comprising operating the second fuel injector to stop the second fuel stream when the second piston is in the second exhaust stroke.

15. The method of claim 10, further comprising:
opening, intermittently, the one or more chambers of the exhaust manifold to one or more of the cylinders;
opening, continuously, the one or more chambers to the exhaust system; and
opening, continuously, the one or more chambers to the EGR circuit.

16. The method of claim 10, further comprising:
arranging the cylinders in a row with an end; and
directing exhaust gas from the exhaust manifold to the EGR circuit from the exhaust manifold adjacent the end.

17. The method of claim 10, further comprising operating the fuel system to supply the second fuel stream when the EGR valve is closed.

18. The method of claim 17, further comprising:
operating, a piston in the second cylinder in an exhaust stroke; and
supplying the second fuel stream when the piston is in the exhaust stroke.

19. An engine system comprising:
a cylinder block defining at least two cylinders including a first cylinder and a second cylinder;
a first piston in the first cylinder and a second piston in the second cylinder, each of the pistons configured to operate in an exhaust stroke to move exhaust gas out of its respective cylinder;
a fuel system configured to intermittently supply a first fuel stream to the first cylinder and to intermittently supply a second fuel stream to the second cylinder;
a fuel injector system with a first fuel injector configured to inject the first fuel stream into the first cylinder and a second fuel injector configured to inject the second fuel stream into the second cylinder;
an intake system supplying combustion air to the cylinders;
an exhaust manifold connected to the cylinder block to receive exhaust gas from the cylinders, the exhaust manifold having one or more interior chambers through which the exhaust gas from the cylinders passes to at least one first outlet located on the exhaust manifold at an intermediate position relative to a direction between the cylinders, the exhaust manifold having a second outlet located on the exhaust manifold closer to the second cylinder than the first cylinder;
an exhaust system configured to receive the exhaust gas from the exhaust manifold through the at least one first outlet; and
an exhaust gas recirculation (EGR) circuit connected to the second outlet and extending between the exhaust manifold and the intake system;
an EGR valve disposed in the EGR circuit; and a controller configured to:
- operate the fuel system to supply the first fuel stream while operating the fuel system to stop the second fuel stream when the second piston is in its respective exhaust stroke;
- open, concurrently with operating the fuel system to supply the first fuel stream, and the EGR valve to supply the exhaust gas to the intake system; and
- operate the fuel system to supply the second fuel stream when the EGR valve is closed and the second piston is in its respective exhaust stroke.

20. The engine system of claim 1, wherein the one or more chambers of the exhaust manifold define a single unitary interior space that is always open to the at least one first outlet and the second outlet.

21. The engine system of claim 1, wherein the one or more chambers of the exhaust manifold define multiple separate interior spaces including a first chamber associated with the first cylinder and a second chamber associated with the second cylinder; and
- wherein the at least one first outlet defines two first outlets, one always open to the first chamber and another always open to the second chamber.

* * * * *